United States Patent [19]

Richeson et al.

[11] Patent Number: 4,996,269

[45] Date of Patent: Feb. 26, 1991

[54] POLYESTER COMPOSITION WHICH IS PARTICULARLY SUITABLE FOR USE IN THERMOFORMING THIN WALLED ARTICLES

[75] Inventors: Donald E. Richeson, North Canton; Judith A. Tweedie, Akron, both of Ohio

[73] Assignee: The Goodyear Tire & Rubber Company, Akron, Ohio

[21] Appl. No.: 25,708

[22] Filed: Mar. 13, 1987

[51] Int. Cl.$^5$ .................... C08L 67/02; B29C 51/00
[52] U.S. Cl. ................... 525/444; 264/544; 524/539
[58] Field of Search ................... 525/444; 264/544

[56] References Cited

U.S. PATENT DOCUMENTS 3,960,807 6/1976 McTaggart ................... 525/177
4,572,852 2/1986 Gartland ................... 428/35

FOREIGN PATENT DOCUMENTS 1431916 4/1976 United Kingdom .

*Primary Examiner*—Patricia Short
*Attorney, Agent, or Firm*—Alvin T. Rockhill

[57] ABSTRACT

This invention relates to a thermoplastic resin composition which is particularly suitable for use in thermoforming thin walled articles. The thermoplastic resin compositions are comprised of (1) from about 94 to about 99 weight percent polyethylene naphthalate and (2) from about 1 to 6 weight percent of at least one polyester elastomer. The subject invention also deals with thermoforming such thermoplastic resin compositions into articles, such as food trays, having a crystallinity within the range of about 10% to about 40%.

6 Claims, No Drawings

POLYESTER COMPOSITION WHICH IS PARTICULARLY SUITABLE FOR USE IN THERMOFORMING THIN WALLED ARTICLES

BACKGROUND OF THE INVENTION

The wide spread popularity of microwave ovens for home use has initiated interest in food trays which can be used in either microwave ovens or convection ovens. Such food trays must be able to withstand oven temperatures which approach 200° C. Such trays are of particular value as containers for frozen prepared foods. It is accordingly necessary for such trays to have good impact strength and dimensional stability at both freezer and oven temperatures. It is, of course, also important for such trays to be capable of withstanding rapid heating from freezer temperatures of about −20° C. to oven temperatures of about 175° C or even higher.

Containers which are capable of being heated in either convection ovens or microwave ovens are sometimes described as being dual-ovenable. Polyesters are highly suitable for use in making such dual-ovenable containers. However, it is important for the polyester to be in the crystalline state rather than the amorphous state in order to achieve satisfactory high temperature stability. Normally, polyesters will undergo crystallization by heat treatment at elevated temperatures and the crystallites formed will remain substantially stable up to near the melting point of the polyester. As a general rule, dual-ovenable containers which are comprised of polyester will be heat treated to attain a crystallinity of higher than about 25%.

Injection molding and thermoforming are widely known methods for forming thermoplastic polyester articles. In injection molding, the polyester is heated above its melting point and injected under sufficient pressure to force the molten polyester to fill the mold cavity. The molten polyester is cooled in the mold until it is rigid enough to be removed. The injection molding of a polyester composition containing 0.5% to 10% by weight isotactic polybutene-1 is described in U.S. Pat. No. 3,839,499. However, the injection molding method is generally not satisfactory for the production of thin walled articles, such as dual-ovenable trays, due to flow lines and layering which develop during the filling of the mold which lead to non-uniform properties, surface irregularities, and warping of the finished article.

Thermoforming is another process which is used commercially in the production of polyester articles. It is a particularly valuable technique for use in producing thin walled articles, such as dual-ovenable food trays, on a commercial basis. In thermoforming, a sheet of preformed polyester is preheated to a temperature sufficient to allow the deformation of the sheet. The sheet is then made to conform to the contours of a mold by such means as vacuum assist, air pressure assist, or matched mold assist. The thermoformed article produced is normally heat treated in the mold in order to attain a crystallinity of at least about 25%.

Crystallization rates can generally be improved by including a small amount of a nucleating agent in polyester compositions. For example, U.S. Pat. No. 3,960,807 discloses a process for thermoforming articles from a polyester composition which is comprised of (1) a crystallizable polyester, (2) a crack stopping agent, preferably a polyolefin, and (3) a nucleating agent. Polyester articles which are made utilizing such compositions generally have improved mold release characteristics and improved impact strength. Additionally, the utilization of such modified polyester compositions results in faster thermoforming cycle times due to the faster rate of crystallization which is attained.

U.S. Pat. No. 4,572,852 discloses a polyester molding composition which consists of (1) polyethylene terephthalate, (2) a polyolefin containing from 2 to 6 carbon atoms, and (3) an effective amount of a heat stabilizer. Thin walled thermoformed articles which are prepared utilizing such compositions exhibit improved impact strength and high temperature stability. For this reason dual-ovenable trays which are comprised of polyester/polyolefin blends are widely utilized commercially. Polyethylene terephthalate having an intrinsic viscosity of at least about 0.65 is widely utilized in such applications. It is necessary for the polyethylene terephthalate used in dual-ovenable trays to have an intrinsic viscosity of at least about 0.65 dl/g in order for the article to have sufficient impact strength at low temperatures, such as those experienced in a freezer.

SUMMARY OF THE INVENTION

It has been unexpectedly found that polyethylene naphthalate/polyester elastomer blends offer an outstanding combination of properties for utilization as thermoplastic resin compositions which can be utilized in thermoforming heat set, thin walled articles such as dual-ovenable containers. In fact, dual-ovenable trays having outstanding creep resistance, excellent impact strength and excellent dimensional stability have been prepared utilizing such polyethylene naphthalate/polyester elastomer blends.

The subject invention discloses a thermoplastic resin composition which is comprised of: (1) from about 94 to about 99 weight percent polyethylene naphthalate and (2) from about 1 to about 6 weight percent of at least one polyester elastomer.

The thermoplastic resin compositions of this invention are particularly valuable for use in thermoforming dual-ovenable containers. Such dual-ovenable containers and techniques for manufacturing them are disclosed by this invention. More specifically, this invention reveals a thermoformed, non-oriented, heat set, thin walled article which is comprised of: (1) from about 94 to about 99 weight percent polyethylene naphthalate: and (2) from about 1 to about 6 weight percent of at least one polyester elastomer. Such thermoformed articles will optimally also contain an effective amount of a heat stabilizer.

DETAILED DESCRIPTION OF THE INVENTION

The thermoplastic resin compositions of this invention are comprised of polyethylene naphthalate (PEN) and at least one polyester elastomer. Such compositions will normally contain from 94 to 99 weight percent PEN and from 1 to 6 weight percent polyester elastomer. It is generally preferred for the thermoplastic resin compositions of this invention to contain from 96 to 98 weight percent PEN and from 2 to 4 weight percent polyester elastomer with the most preferred compositions containing from about 2.5 to about 3.5 weight percent polyester elastomer and from about 96.5 to about 97.5 weight percent PEN. PEN is comprised of repeat units which are derived from a naphthalene dicarboxylic acid or a diester thereof and ethylene glycol or a diester thereof. The PEN utilized in the thermoplastic resin compositions of this invention can be a modified PEN. Such modified PEN can contain small amounts of repeat units which are derived from diacids other than a naphthalene dicarboxylic acid and/or glycols in addition to ethylene glycol. For instance, small amounts of isophthalic acid or a terephthalic acid can be used in the diacid component utilized in preparing the PEN. PEN which has been modified with a small amount of a diol containing from 3 to 8 carbon atoms is also representative of a modified PEN which can be used. For instance, a small amount of 1,4-butane diol can be utilized in the glycol component used in preparing the modified PEN. Normally, no more than about 5 weight percent of the repeat units in such modified PEN will be comprised of diacids or diols other than a naphthalene dicarboxylic acid and ethylene glycol. It is, of course, contemplated that diesters of such dicarboxylic acids and diols can also be used. In most cases, such modified PEN will contain less than about 3% diacids other than naphthalene dicarboxylic acids and less than 3% diols other than ethylene glycol. It will normally be preferred for such modified polyesters to contain only about 1% dicarboxylic acids other than naphthalene dicarboxylic acids and/or less than 1% glycols other than ethylene glycol. In any case polyethylene naphthalate homopolymer is an excellent choice for utilization in the thermoplastic resin compositions of this invention.

For term polyethylene naphthalate as used herein is accordingly intended to include polyethylene naphthalates in which at least 95 mole percent of the recurring units consists of ethylene naphthalene-2,6-dicarboxylate and also copolymerized naphthalate polyesters. In general, these naphthalate polyesters are prepared by polycondensing 2,6-naphthalenedicarboxylic acids or their functional derivatives such as lower alkyl esters with ethylene glycol or its functional derivatives such as ethylene oxide and ethylene carbonate in the presence of a catalyst until the intrinsic viscosity of the polymer reaches at least 0.5 dl/g. Before completion of the preparation of such polyethylene naphthalate, less than mole percent, based on the recurring units of the polyester, of at least one suitable copolymerizable component may be added to form copolymerized polyesters.

The copolyester component includes compounds having two ester-forming functional groups: (a) dibasic organic acids for example, aliphatic dicarboxylic acids such as oxalic acid, succinic acid, adipic acid and sebacic acid: aliyclic dicarboxylic acids such as cyclopropanedicarboxylic acid, cyclobutanedicarboxylic acid and hexahydroterephthalic acid aromatic dicarboxylic acids such as orthophthalic acid, isophthalic acid, terephthalic acid, naphthalene-2,7-dicarboxylic acid, naphthalene-1,4-dicarboxylic acid, naphthalene-1,5-dicarboxylic acid, and diphenyldicarboxylic acid, other dicarboxylic acids such as diphenylether dicarboxylic acid, diphenyl sulfone dicarboxylic acid, diphenoxyethane dicarboxylic acid, and sodium, 3,5-dicarboxybenzenesulfonate: (b) oxycarboxylic acids such as glycolic acid, p-oxybenzoic acid and p-oxyethoxybenzoic acid; and (c) diols for instance, oxy compounds such as propylene glycol, trimethylene glycol, diethylene glycol, tetramethylene glycol, hexamethylene glycol, neopentylene glycol, p-xylene glycol, 1,4-cyclohexane dimethanol, 2,2-bishydroxyphenyl propane, p,p-dihydroxyphenylsulfone, 1,4-bis($\beta$-hydroxethoxy)benzene, 2,2-bis(p-$\beta$-hydroxyethoxyphenyl) propane, and p-phenylene bis(methylonyl cyclohexane), and their functional derivatives. These dicarboxylic acids, oxycarboxylic acids, diols or their functional derivatives may be added as monomers or highly polymerized compounds derived from these copolyester components in accordance with known means.

For the purpose of adjusting the molecular weight of the polymer, compounds having one ester forming functional groups, such as naphthoic acid, benzoyl benzoic acid, and benzyloxybenzoic acid can be used as the copolyester component. It is also possible to use compounds having three or more ester-forming functional groups, such as glycerine, pentaerythritol and trimethylol propane, can also be used so long as the resulting polymer is substantially linear.

The PEN utilized in the thermoplastic resin compositions of this invention will normally have an intrinsic viscosity (I.V.) of at least 0.7 dl/g. In most cases it will be preferred for the PEN to have an I.V. of at least 0.8 dl/g with an I.V. of over 0.9 dl/g being more preferred. Intrinsic viscosity is defined as the limit of the fraction ln (v)/C as C, the concentration of the polymer solution, approaches O, wherein v is the relative viscosity which is measured at several different concentrations in a 60/40 mixed solvent of phenol and ortho-dichlorobenzene at 35° C.

Virtually any type of polyester elastomer can be utilized in the thermoplastic resin compositions of this invention. Such polyester elastomers are widely commercially available. For instance, E.I. duPont deNemours & Co. sells suitable polyester elastomers under the trademark Hytrel ™. DuPont Hytrel ™ 4074 has been determined to be highly suitable for use as the polyester elastomer in the thermoplastic resin compositions of this invention.

The polyester elastomers used in the thermoplastic resin compositions of this invention will normally contain both polyether and polyester segments. For example, such a polyester elastomer is comprised of the reaction product of (a) terephthalic acid or a dialkyl ester thereof, (b) a dimer acid, (c) a poly(tetramethylene oxide) glycol and (d) 1,4-butane diol. Polyester elastomers of this general type are described in greater detail in U.S. Pat. No. 4,254,001, which is hereby incorporated herein by reference in its entirety. Similar polyester elastomers which additionally contain chain branching agents and ionic compounds are described in U.S. Pat. No. 4,383,106 and U.S. Pat. No. 4,390,687. U.S. Pat. No. 2,623,031, U.S. Pat. No. 3,023,192, U.S. Pat. No. 3,651,014, U.S. Pat. No. 3,763,109, U.S. Pat. No. 3,766,146, U.S. Pat. No. 3,896,078, U.S. Pat. No. 4,013,624, and U.S. Pat. No. 4,264,761, all of which are incorporated herein by reference in their entirety, also describe polyester elastomers and techniques that can be utilized in their preparation.

The thermoplastic resin composition of this invention will preferably contain one or more heat stabilizers. The inclusion of one or more heat stabilizers has particular utility when the finished article being made from the resin will be subjected to high service temperature conditions for long periods of time. The retention of adequate physical properties, especially impact strength, is very important in applications such as food trays for use in dual-ovenable applications. Heat stabilizers as used herein are compounds which demonstrate antioxidant properties, the most important of which is the capacity of inhibiting oxidation. An effective heat stabilizer in the practice of this invention must be capable of protecting the thermoformed article during exposure to elevated temperatures. The following compounds are representative examples of useful heat stabilizers which can be incorporated into the thermoplastic resin compositions of this invention: alkylated substituted phenols, bisphenols, thiobisacrylates, aromatic amines, organic phosphites, and polyphosphites. The particular aromatic amines which demonstrate specific heat stabilizing capabilities include: primary polyamines, diarylamines, bisdiarylamines, alkylated diarylamines, ketone-diarylamine condensation products, aldehyde-amine condensation products, and aldehyde imines. Conditions which would be considered severe would be those in which the thermoformed article would be exposed to temperatures near 200° C. for periods exceeding about 30 minutes. Preferred heat stabilizers for such severe high temperature applications, particularly where any staining or discoloration from the heat stabilizer is undesirable, are the polyphenols which contain more than two phenol ring structures. Some representative examples of suitable polyphenols include tetrakis(methylene-3(3,5-di-t-butyl-4-hydroxy phenyl)proprionate)methane and 1,3,5-trimethyl-2,4,6-tris (3,5-di-t-butyl-4-hydroxybenzyl)benzene.

Persons skilled in the art will be able to easily ascertain the effective amount of heat stabilizer needed, with this amount generally being within the range of about 0.005 to about 2% by weight based upon the total weight of the thermoplastic resin composition. It will normally be preferred for the amount of heat stabilizer utilized to be within the range of 0.01 to 0.5% by weight, based upon the total weight of the thermoplastic resin composition. The amount of heat stabilizer used will vary with such factors as the degree of protection required, the severity of heat exposure, solubility limitations of the heat stabilizer chosen in the thermoplastic resin composition, and the overall effectiveness of the heat stabilizer.

One or more pigments or colorants can also be added to the thermoplastic resin composition in order to provide it with a desired color. For instance, titanium dioxide can be included in the thermoplastic resin composition in order to provide it with a brilliant white color. One or more colorants can also be added to the thermoplastic resin composition in order to provide it with any of a multitude of colors. Such colorants will normally not act as nucleating agents. Some representative examples of non-nucleating organic colorants include: phthalocyanine blue, solvent red 135, and disperse yellow 64 (CAS No. 10319-14-9). Many other dyes of the solvent and disperse groups are also useful for coloring the thermoplastic resin compositions of this invention. The amount of colorant or combination of colorants needed to obtain a specific desired color can be easily ascertained by persons skilled in the art.

The thermoplastic resin compositions of this invention can be prepared by simply melt blending the PEN with the polyester elastomer and optionally a heat stabilizer and/or a colorant. Such melt blending is done at a temperature at which the PEN is in the liquid state. PEN has a melting point of about 275° C. Since such a melt blending procedure must be carried out above the melting point of the PEN, it will normally be done at a temperature within the range of about 280° C. to 375° C. Normally, it is preferred for the melt blending procedure to be carried out at a temperature within the range of about 295° C. to 350° C. In such a melt blending procedure, the polyester elastomer is simply dispersed throughout the molten PEN. Sufficient mixing action will be applied so as to result in the formation of a homogeneous system. In other words, the polyester elastomer and any heat stabilizers or colorants added should be uniformly dispersed throughout the PEN in order to produce optimal thermoplastic resin compositions. Such a melt blending procedure can commercially be carried out in extruders which provide sufficient shearing forces so as to result in adequate mixing.

After the thermoplastic resin compositions of this invention have been prepared, they can be utilized in making a wide variety of useful articles of manufacture. The thermoplastic resin compositions of this invention have particular value for use as thermoforming compositions from which thin walled articles such as dual-ovenable trays can be made. The articles of manufacture to which this invention relates are thin walled thermoformed articles. Thin walled as used herein means articles having wall thicknesses of less than about 1 mm. An article having a wall thickness of greater than 1 mm (40 mils) could be made using this invention with its thermoforming techniques only if the preformed sheet could be preheated to a suitable thermoforming temperature while maintaining the substantial amorphous state of the sheet. However, currently available methods of preheating the sheet do not uniformly distribute heat quickly enough to minimize crystallinity increase prior to forming when the parts have a wall thickness of greater than about 1 mm.

Since a partially crystalline finished article is necessary for good dimensional stability at high temperatures, knowledge of the degree of crystallinity or percent of crystallinity is of considerable importance. Density is a convenient method of determining the percent of crystallinity since there is a direct relationship between the two for a given polyester composition. A calibrated gradient column can be used for determining density at a particular temperature. The density value can then be converted into a percent of crystallinity.

The terms crystallization temperature and crystallization onset are used interchangeably to mean the temperature or temperature range in which a regularly repeating morphology, brought about by a combination of molecular mobility and secondary bonding forces, is induced in a polymer over a molecular distance of at least several hundred angstroms. The crystallization temperature or crystallization onset can be visually observed as the point at which a substantially amorphous, unoriented sheet of PEN/polyester elastomer changes from a translucent, hazy appearance to a white appearance.

As used throughout this specification and the appended claims, the term glass transition temperature means that temperature or temperature range at which a change in slope appears in the volume versus temperature curve for said polymer and defining a temperature region below which the polymer exhibits a glassy characteristic and above which the polymer exhibits a rubbery characteristic. The glass transition temperature (Tg) of polyethylene naphthalate is about 120° C.

Another aspect of this invention relates to a process for producing heat set, thin-walled articles from the thermoplastic resin compositions of this invention using conventional thermoforming equipment. The complete technique consists of the following steps:
1. Forming a substantially amorphous sheet from the homogeneously blended PEN/polyester elastomer composition.

2. Preheating the sheet until it softens and positioning it over the mold.
3. Drawing the preheated sheet onto the heated mold surface.
4. Heatsetting the formed sheet by maintaining sheet contact against the heated mold for a sufficient time period to partially crystallize the sheet.
5. Stripping the part out of the mold cavity.

The sheeting and film for use in the thermoforming process can be made by any conventional method. The most common method being by extrusion through a flat die. It is important that the sheet or film be quenched immediately after extrusion in order to minimize the extent of crystallization developed after forming.

The term substantially amorphous as used herein shall mean a sheet having a level of crystallinity low enough to enable thermoforming of the sheet to be accomplished with satisfactory mold definition and part formation. In currently available thermoforming processes, the level of crystallinity of the preformed sheet should not exceed about 10 percent.

The preheating of the substantially amorphous sheet prior to positioning over the thermoforming mold is necessary in order to achieve the very short molding times required for a viable commercial process. The sheet must be heated above its Tg and below the point at which it sags excessively during positioning over the mold cavity. The preferred range is 140° C. to 220° C., most preferably 170° C. to 190° C.

This invention can be practiced by using any of the known thermoforming methods assist, air assist, mechanical plug assist or matched mold. The mold should be preheated to a temperature sufficient to achieve the degree of crystallinity desired. Selection of the optimum mold temperature is dependent upon the type of thermoforming equipment, configuration and wall thickness of the article being molded and other factors. The operable range of mold temperatures is normally within the range of about 160° C. to about 225° C. The preferred range is from about 180° C. to about 200° C.

Heatsetting is a term describing the process of thermally inducing partial crystallization of a polyester article without appreciable orientation being present. In the practice of this invention, heatsetting is achieved by maintaining intimate contact of the film or sheet with the heated mold surface for a sufficient time to achieve a level of crystallinity which gives adequate physical properties to the finished part. It has been found that desirable levels of crystallinity should be about 10 to about 35 percent. For containers to be used in high temperature food application, it was found that levels of crystallinity above 15 percent were necessary for adequate dimensional stability during demolding operations. A preferred range of crystallinity is from 20 to 30 percent, this range yields parts with excellent dimensional stability and impact resistance.

The heat set part can be stripped out of the mold cavity by known means for removal. One method, blow back, involves breaking the vacuum established between the mold and the formed sheet by the introduction of compressed air. In commercial thermoforming operation, the part is subsequently trimmed and the scrap ground and recycled.

In the preparation of films or sheeting for subsequent use in thermoforming processes, it is extremely important that the polyester elastomer be homogeneously dispersed throughout the PEN to form a homogeneous blend in order to achieve optimum results. The film can be produced by conventional extrusion or casting methods. Depending upon the method employed in making the film or sheeting, the intrinsic viscosity of the film or sheeting produced may be nearly the same or slightly lower than the intrinsic viscosity of the starting thermoplastic resin composition. In other words, the intrinsic viscosity of the thermoplastic resin composition may be reduced slightly by the casting or extrusion process. The thermoformed articles made should have intrinsic viscosities which are similar to the intrinsic viscosities of the film or sheeting from which they are made.

Throughout the specification and appended claims, all percent expressions are weight percent based on the total weight of the composition polymer, sheet or article. The following examples are intended to be illustrative of the invention rather than limiting its scope.

EXAMPLE 1

A PEN resin having an I.V. of 0.93 was extruder blended with Hytrel ™ 4074 (a polyester elastomer). The thermoplastic resin composition made contained about 97% PEN and 3% polyester elastomer. The resin was extruded utilizing a 1.75 inch (4.45 cm) extruder which was operated at a temperature within the range of 305° C. to 325° C. utilizing an extruder speed of 52 rpm and a die temperature of 299° C. The extruder screw produced sufficient shearing force to homogeneously blend the polyester elastomer into the PEN. The sheeting prepared had a width of 11.5 inches (29.2) and a thickness of 0.03 inches (0.076 cm) and was prepared utilizing a casting roll temperature of 118° C. and a take up speed of 4 feet/minute (121.9 cm/minutes).

The sheeting produced had an I.V. of 0.782 dl/g, a glass transition temperature within the range of 110° C. to 127° C., a crystallization temperature within the range of 170° C. to 219° C. (midpoint 193° C.) and a melting point within the range of 248° C. to 282° C. Thus, there was a 29° C. difference in the temperature at which melting begun from the temperature at which crystallization ended. This temperature difference was caused by the presence of the polyester elastomer in the PEN because there is no temperature difference between the temperature at which crystallization ended and the temperature at which melting begins in the case of pure PEN. A substantial difference between the temperature at which crystallization ends and melting begins is required in order to attain adequate crystallinity in the molded article.

The sheeting prepared was thermoformed into trays utilizing a Comet thermoformer. The thermoforming process was carried out utilizing a preheat time of 45 seconds, a mold time of 8 seconds, a sheet temperature of 180° C., a mold temperature of 193° C., a top oven temperature of 216° C., and a bottom oven temperature of 160° C. The trays prepared in this experiment were very satisfactory. In fact, they were determined to have impact strengths that make them suitable for use in dual-ovenable applications.

EXAMPLE 2 (Comparative)

In this experiment, sheeting was prepared utilizing the procedure described in Example 1 except that an ionomer modified polyethylene (Surlyn ™ 9721) was used in place of the polyester elastomer. However, the ionomer modified elastomer did not improve the crystallization behavior of the PEN. In fact, no temperature difference was observed using DSC analysis between the temperature at which crystallization ended and the temperature at which melting begins.

EXAMPLE 3 (Comparative)

In this experiment, sheeting was prepared utilizing the procedure described in Example 1 except that linear low density polyethylene was used in place of the polyester elastomer. However, the linear low density polyethylene did not improve the crystallization behavior of the blend. In fact, a temperature difference of only 3° C. was observed between the temperature at which crystallization ended and the temperature at which melting begun.

While certain representative embodiments and details have been shown for the purpose of illustrating this invention, it will be apparent to those persons skilled in this art that various changes and modifications can be made therein without departing from the scope of this invention.

What is claimed is:

1. A thermoformed, non-oriented, heat-set, thin walled article which consists of (1) from about 94 to about 99 weight percent polyethylene naphthalate, (2) from about 1 to about 6 weight percent of at least one polyester elastomer, and (3) an effective amount of a heat stabilizer.

2. A process for making a heat set, partially crystalline, thin walled article which comprises: thermoforming a substantially amorphous sheet which consists of the thermoplastic resin composition specified in claim 1, wherein said thermoforming is carried out in a heated mold for a time sufficient to achieve a crystallinity in said article which is within the range of about 10% to about 40%, wherein said polyester elastomer is comprised of polyester segments and polyether segments and wherein said thermoplastic resin composition has an intrinsic viscosity of at least 0.8 dl/g.

3. A process as specified in claim 2 wherein said amorphous sheet is preheated to a temperature which is within the range of 140° C., to 220° C., wherein a mold temperature within the range of about 160° C. to about 225° C. is utilized and wherein said thermoplastic resin composition is comprised of from 96 to 98 weight percent polyethylene naphthalate and from 2 to 4 weight percent polyester elastomer.

4. A process as specified in claim 3 wherein said thermoforming is carried out for a time sufficient to achieve a crystallinity in said article which is within the range of about 20 percent to about 30 percent.

5. A thermoformed, non-oriented, heat-set, thin walled article which consists of (1) from about 94 to about 99 weight percent polyethylene naphthalate, (2) from about 1 to about 6 weight percent of at least one polyester elastomer, (3) an effective amount of a heat stabilizer, and (4) at least one non-nucleating organic colorant.

6. A process for making a heat set, partially crystalline, thin walled article which comprises: thermoforming a substantially amorphous sheet which consists of the thermoplastic resin composition specified in claim 5, wherein said thermoforming is carried out in a heated mold for a time sufficient to achieve a crystallinity in said article which is within the range of about 10% to about 40%.

* * * * *